(12) United States Patent
Wang

(10) Patent No.: US 12,259,732 B2
(45) Date of Patent: *Mar. 25, 2025

(54) MOVING ROBOT CAPABLE OF RECOGNIZING CARPET

(71) Applicant: PixArt Imaging Inc., Hsin-Chu County (TW)

(72) Inventor: Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,999

(22) Filed: Sep. 28, 2023

(65) Prior Publication Data

US 2024/0019871 A1    Jan. 18, 2024

Related U.S. Application Data

(63) Continuation of application No. 17/344,960, filed on Jun. 11, 2021, now Pat. No. 11,809,195, which is a
(Continued)

(51) Int. Cl.
| | |
|---|---|
| *G05D 1/246* | (2024.01) |
| *A47L 9/00* | (2006.01) |
| *A47L 9/28* | (2006.01) |
| *A47L 9/30* | (2006.01) |
| *G05D 1/00* | (2006.01) |
| *G06T 7/62* | (2017.01) |

(Continued)

(52) U.S. Cl.
CPC ............ *G05D 1/0246* (2013.01); *A47L 9/009* (2013.01); *A47L 9/2826* (2013.01); *A47L 9/2842* (2013.01);
(Continued)

(58) Field of Classification Search
CPC .... G05D 1/0246; G05D 1/0248; A47L 9/009; A47L 9/2826; A47L 9/2842; A47L 9/2847; A47L 9/2852; A47L 9/30; A47L 2201/04; A47L 2201/06; A47L 11/4011; A47L 11/4061; G06T 7/62; G06T 7/73; G06T 2207/30261; G06T 7/521; G06T 2207/10016; G06T 2207/30252; G06V 10/141; G06V 20/10; G06V 20/58
See application file for complete search history.

(56) References Cited

U.S. PATENT DOCUMENTS

| | | | |
|---|---|---|---|
| 9,002,511 B1 * | 4/2015 | Hickerson | ............... G01S 7/483 700/245 |
| 2005/0112541 A1 | 5/2005 | Durack et al. | |

(Continued)

*Primary Examiner* — Amara Abdi
(74) *Attorney, Agent, or Firm* — WPAT, PC

(57) ABSTRACT

There is provided a moving robot including a light projector, an image sensor and a processing unit. The light projector projects a vertical light segment and a horizontal light segment toward a moving direction. The image sensor captures, toward the moving direction, an image frame containing a first light segment image associated with the vertical light segment and a second light segment image associated with the horizontal light segment. The processing unit recognizes a plush carpet in the moving direction when a vibration intensity of the second light segment image is higher than a predetermined threshold, and an obstacle height calculated according to the first light segment image is larger than a height threshold.

20 Claims, 8 Drawing Sheets

Related U.S. Application Data continuation-in-part of application No. 16/423,571, filed on May 28, 2019, now Pat. No. 11,294,391.

(51) Int. Cl.
*G06T 7/73* (2017.01)
*G06V 10/141* (2022.01)
*G06V 20/10* (2022.01)
*G06V 20/58* (2022.01)

(52) U.S. Cl.
CPC ........... *A47L 9/2847* (2013.01); *A47L 9/2852* (2013.01); *A47L 9/30* (2013.01); *G06T 7/62* (2017.01); *G06T 7/73* (2017.01); *G06V 10/141* (2022.01); *G06V 20/10* (2022.01); *G06V 20/58* (2022.01); *A47L 2201/04* (2013.01); *A47L 2201/06* (2013.01); *G06T 2207/30261* (2013.01)

(56) References Cited

U.S. PATENT DOCUMENTS

| | | |
|---|---|---|
| 2006/0115160 A1* | 6/2006 | Jung ................... G06V 10/145 |
| | | 382/199 |
| 2016/0144511 A1 | 5/2016 | Romanov et al. |
| 2016/0224730 A1 | 8/2016 | Yu et al. |
| 2016/0375592 A1* | 12/2016 | Szatmary ............... B25J 9/1674 |
| | | 700/250 |
| 2017/0267871 A1 | 9/2017 | Nowak et al. |
| 2018/0193559 A1 | 7/2018 | Hirata et al. |
| 2018/0292203 A1 | 10/2018 | Akagi et al. |
| 2019/0156481 A1 | 5/2019 | Sekiguchi et al. |
| 2019/0302000 A1* | 10/2019 | Lo ......................... G01J 3/0229 |
| 2019/0384963 A1* | 12/2019 | Kim ..................... G06V 20/698 |
| 2020/0159185 A1* | 5/2020 | Watanabe ............. B33Y 50/00 |
| 2020/0167914 A1* | 5/2020 | Stamatoyannopoulos .................. |
| | | G16B 40/30 |

* cited by examiner

MOVING ROBOT CAPABLE OF RECOGNIZING CARPET

RELATED APPLICATIONS

The present application is a continuation application of U.S. patent application Ser. No. 17/344,960 filed on Jun. 11, 2021, which is a continuation-in-part application of U.S. patent application Ser. No. 16/423,571 filed on May 28, 2019, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a moving robot and, more particularly, to a moving robot with improved accuracy of identifying a plush carpet in front of a moving direction thereof.

2. Description of the Related Art

The cleaning robot has become one important product among various home appliances in a smart home. During operation, the cleaning robot builds up a working map through identifying distances from various obstacles.

In a cleaning robot adopting an image sensor as the detecting means, in addition to the regular surface such as a tile floor or a wood floor, the cleaning robot is also operated on other special surfaces such as a plush carpet.

However, it is necessary to recognize the plush carpet in front of a moving direction since the cleaning robot should operate differently on the plush carpet. Conventionally, a plush carpet is identified by using a brush located at a bottom surface of the cleaning robot. If the brush confronts a higher frictional force in rotating, the plush carpet may be confirmed. However, there are generally hairs on the floor. When the hairs are twisted round the brush, the frictional force becomes higher and thus it is possible to identify a plush carpet mistakenly. Furthermore, by using the brush, the plush carpet can only be detected when the cleaning robot is very close to or event already on the plush carpet. In the scenario that a cleaning robot has to speed up in order to climb up the plush carpet, the cleaning robot does not have enough time to speed up if the plush carpet is detected too late.

Accordingly, it is necessary to provide a moving robot that is able to recognize a plush carpet from a distance with high accuracy such that the moving robot can have enough time to speed up or perform other controls.

SUMMARY

The present disclosure provides a moving robot that can improve the accuracy of identifying a plush carpet in front of a moving direction by projecting a vertical light segment and a horizontal light segment at the moving direction.

The present disclosure provides a moving robot including a light projector, an image sensor and a processing unit. The light projector is configured to project a vertical light segment toward a moving direction. The image sensor is configured to capture an image frame containing a light segment image associated with the vertical light segment. The processing unit is configured to search a broken point which separates the light segment image into two parts in the image frame, calculate a transverse distance between the two parts of the light segment image, obtain an obstacle height corresponding to the transverse distance, and output a flag signal indicating a plush carpet being confirmed in the moving direction when the obstacle height is smaller than an upper threshold and larger than a lower threshold.

The present disclosure further provides a moving robot including a first light projector, a third light projector, an image sensor and a processing unit. The first light projector is configured to project a vertical light segment toward a moving direction. The third light projector is configured to project a horizontal light segment toward the moving direction. The image sensor is configured to capture an image frame containing a first light segment image associated with the vertical light segment and a second light segment image associated with the horizontal light segment. The processing unit is configured to recognize that there is no plush carpet in the moving direction when a vibration intensity of the second light segment image is not higher than a predetermined threshold.

In the moving robot of the present disclosure, the processing unit is arranged inside a sensing chip. The processing unit outputs a flag signal via an independent leg of the sensing chip. The flag signal is used to indicate a confidence level of a step distance calculated by the processing unit. When a low confidence level is indicated, the flag signal is used to inform a central processing unit (CPU) or a microcontroller unit (MCU) of the moving robot to trigger another sensor or use a built-in look up table to identify a current step distance. When a high confidence level is indicated, the flag signal is used to inform the CPU or the MCU of the moving robot to directly use the current step distance outputted by the sensing chip.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The moving robot of some embodiments of the present disclosure is to accurately calculate a step distance (or referred to a cliff distance) in front of a moving direction so as to prevent falling and to accurate construct a working map on various operating surfaces.

The moving robot of other embodiments of the present disclosure is to recognize a plush carpet in front by the optical method.

Figure 1:
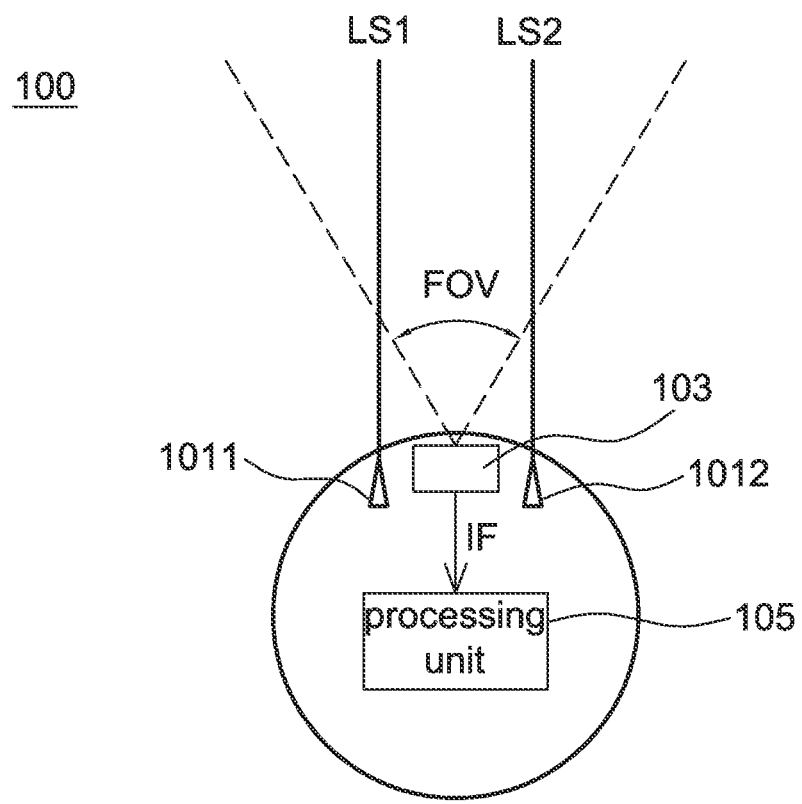
FIG. 1 is a top view of a moving robot according to one embodiment of the present disclosure.
Figure 2:
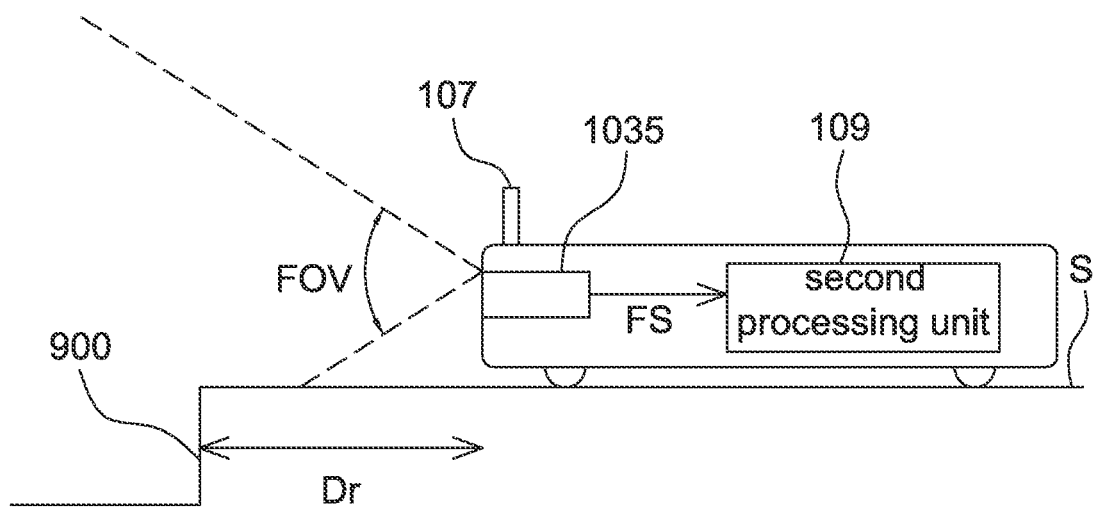
FIG. 2 is a side view of a front step and a moving robot according to one embodiment of the present disclosure.

Referring to FIGS. 1 and 2 together, FIG. 1 is a top view of a moving robot 100 according to one embodiment of the present disclosure; and FIG. 2 is a side view of a step 900 in front and a moving robot 100 according to one embodiment of the present disclosure.

The moving robot 100 includes at least one light projector (e.g., FIG. 1 showing a first light projector 1011 and a second light projector 1012), an image sensor 103 and a processing unit 105, wherein the image sensor 103 and the processing unit 105 forms a sensing chip 1035 (as shown in FIG. 2) to be installed on the moving robot 100 and coupled to a second processing unit 109, e.g., a central processing unit (CPU) or a microcontroller unit (MCU), of the moving robot 100. In some aspects, the at least one light projector is also included in the sensing chip 1035.

It is appreciated that although FIG. 1 shows two light projectors, a single light projector is enough for calculating a step distance Dr in front. Two light projectors are for increasing a detection range in front of the moving direction.

Each of the first light projector 1011 and the second light projector 1012 includes a light source and a diffractive optical element (DOE). The light source is preferably a coherent light source for emitting light of an identifiable spectrum, e.g., an infrared laser diode, but not limited to. Besides, the light source is selected from a partially coherent light source or non-coherent light source. After the light emitted by the light source passes the diffractive optical element, a linear (i.e., length much larger than width) light segment is formed.

The first light projector 1011 and the second light projector 1012 respectively project a vertical (corresponding to an operating surface S shown in FIG. 2) light segments or light stripes LS1 and LS2 toward a moving direction. When there is no obstacle in front of the moving direction, two parallel light segments LS1 and LS2 are formed on the operating surface in front. When there is a step 900 (e.g., FIG. 2 showing a cliff at a distance Dr) in front of the moving direction, the light segments LS1 and LS2 disappear at the distance Dr. If the distance Dr is longer, lengths of the light segments LS1 and LS2 are longer; on the contrary, if the distance Dr is shorter, lengths of the light segments LS1 and LS2 are shorter. In this way, lengths of the light segments LS1 and LS2 reflect a step distance Dr in front of the moving robot 100.

Figure 3:
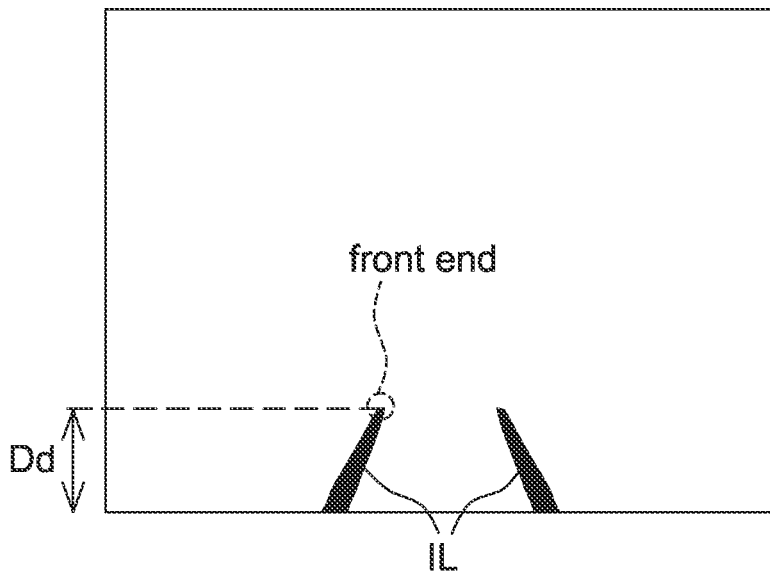
FIG. 3 is a schematic diagram of an image frame captured by a moving robot according to one embodiment of the present disclosure.

The image sensor 103 is a CCD image sensor, a CMOS image sensor or other sensors for converting light energy to electrical signals. The image sensor 103 has a plurality of pixels arranged in a matrix and operates at a predetermined frame rate toward the moving direction. The image sensor 103 captures, with a field of view FOV, an image frame IF containing light segment images IL associated with the light segments LS1 and LS2 as shown in FIG. 3. It is appreciated that if a single light projector is used, the image frame IF contains one light segment image IL.

The processing unit 105 is, for example, a digital signal processor (DSP), field programmable gate array (FPGA) or an application specific integrated circuit (ASIC), and is electrically connected to the at least one light projector and the image sensor 103 for controlling the light source to emit light corresponding to the image capturing of the image sensor 103. The processing unit 105 receives the image frame IF outputted by the image sensor 103, and calculates an image feature and a step distance Dr according to the light segment images IL in the image frame IF associated with the light segments LS1 and LS2. The image feature is used to identify whether a current operating surface is a flat surface or not to accordingly determine a proper calculation method. It is able to obtain a corresponding step distance Dr using a look up table or an algorithm when obtaining a vertical length (referred to a segment height below) of a light segment image IL in the image frame IF.

Figure 4:
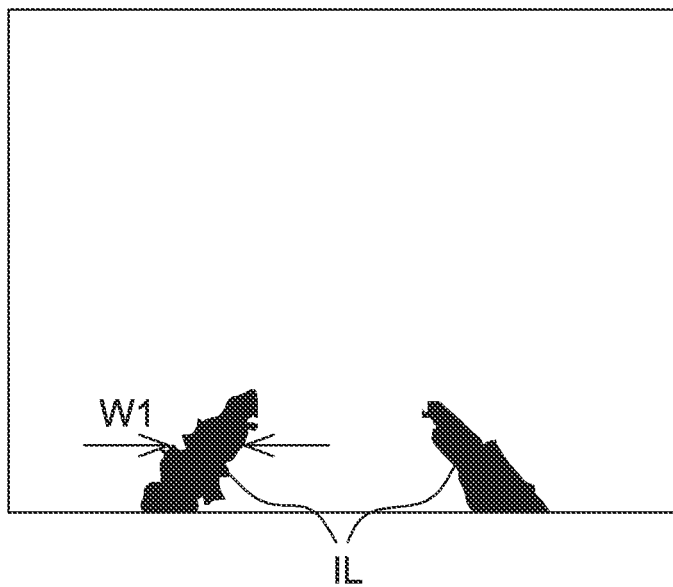
FIG. 4 is a schematic diagram of an image frame of an irregular operating surface captured by a moving robot according to one embodiment of the present disclosure.

For example referring to FIG. 4, it shows an image frame IF of a plush carpet captured by the image sensor 103. It is seen that a width W1 of the light segment image IL in FIG. 4 is wider than that of FIG. 3. The processing unit 105 further includes a memory for pre-storing a width threshold. When the processing unit 105 identifies that the width W1 of the light segment image IL in the image frame IF is wider than the width threshold, it means that the current operating surface is an irregular surface.

In some aspects, the memory of the moving robot 100 pre-stores multiple different width thresholds corresponding to different operating surfaces. The processing unit (105 or an external processing unit outside the sensing chip 1035) identifies a type of an operating surface according to the width W1 of the light segment image IL in the image frame IF. The memory stores the relationship between the segment height Dd and the step distance Dr corresponding to different types of the operating surface.

Figure 5A:
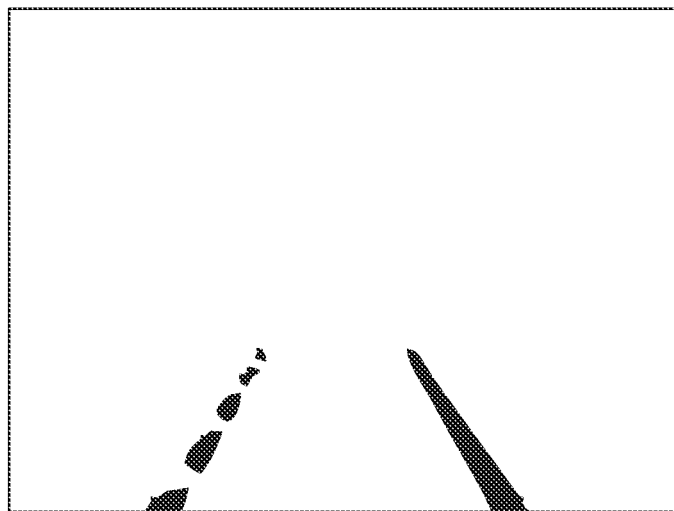
FIG. 5A is another schematic diagram of an image frame of an irregular operating surface captured by a moving robot according to one embodiment of the present disclosure.

Referring to FIG. 5A, it shows an image frame IF of a current operating surface, which has ridges and valleys, captured by the image sensor 103. It is seen from FIG. 5A that the light segment image IL is a broken line because a part of the current operation surface, e.g., the valleys, is not illuminated by the light segment LS1. When the processing unit 105 identifies that the light segment image IL in the image frame IF is a broken line, it means that a current operating surface is an irregular surface.

Figure 5B:
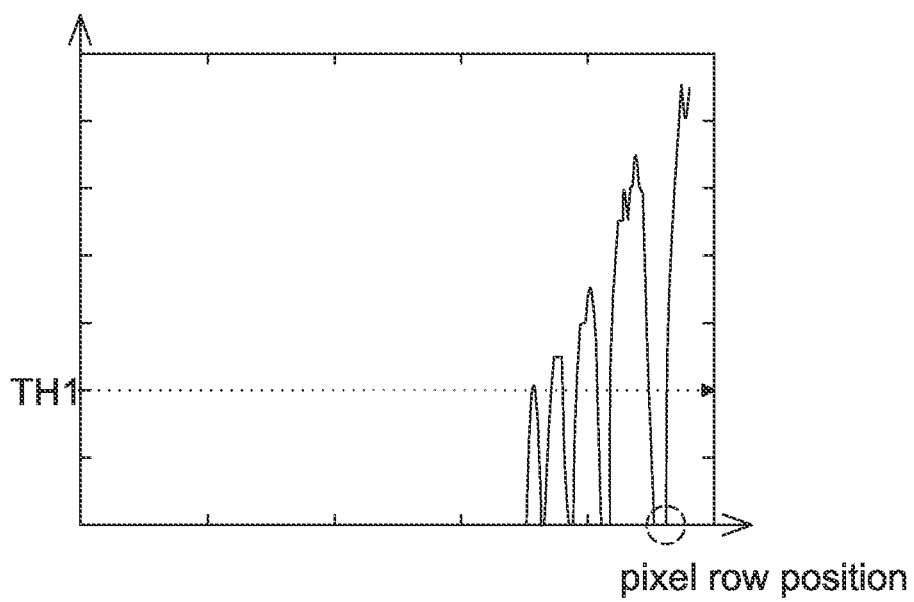
FIG. 5B is a schematic diagram of identifying a broken light segment image in the image frame of FIG. 5A.

One way to identify the broken line is shown in FIG. 5B for illustration purposes. The processing unit 105 calculates gray level sums every pixel row of multiple pixel rows of the image frame IF, or divides the image frame IF into a left image frame and a right image frame (in the case having two light projectors) at first and then respectively calculates gray level sums of multiple pixel rows of the left and right image frames. As shown in FIG. 5B, the processing unit 105 obtains the relationship between the gray level sums and the pixel row positions. The processing unit 105 determines whether a broken line exists by using a gray level threshold TH1, e.g., a dip lower than the gray level threshold TH1 appearing between two peaks of the gray level sums. By properly selecting the gray level threshold TH1, a broken light segment image IL is confirmed when the processing unit 105 identifies more than one dip.

In other words, the image feature of the present disclosure includes the segment width W1 of the light segment image IL (as shown in FIG. 4) and whether the light segment image IL is a broken line (e.g., according to a number of dips of gray level sums of pixel rows in FIG. 5B).

In the present disclosure, the processing unit 105 outputs a flag signal FS according to the image feature to indicate the type of an operating surface, select a suitable distance calculation algorithm, indicate a confidence level of an image frame and/or indicate a confidence level of an outputted step distance. For example, the sensing chip 1035 has an independent leg (not shown) for exclusively outputting the flag signal FS. Said independent is referred to that the leg is only for outputting the flag signal FS without outputting other signals (e.g., not outputting the step distance Dr obtained by the processing unit 105).

Figure 6:
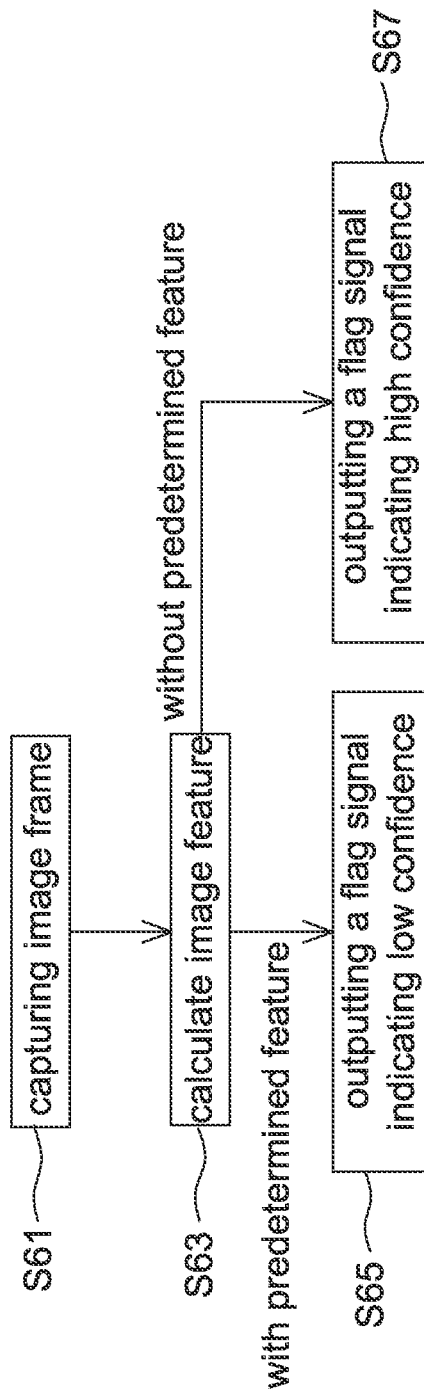
FIG. 6 is a flow chart of an operating method of a moving robot according to one embodiment of the present disclosure.

Referring to FIG. 6, it is an operational flow chart of a moving robot of the present disclosure that is adaptable to the moving robot 100 shown in FIGS. 1 and 2. The operating method includes the steps of: capturing an image frame by an image sensor (Step S61); calculating an image feature of a light segment image in the image frame (Step S63); outputting a flag signal indicating a low confidence level when the image feature includes a predetermined feature (Step S65); and outputting a flag signal indicating a high confidence level when the image feature does not include the predetermined feature (Step S67), wherein the predetermined feature is shown in FIGS. 4 and 5A. The confidence level is represented by a digital signal having a predetermined bit (e.g., 1 to 2 bits), e.g., 01 indicating the high confidence level and 10 indicating the low confidence level, but not limited thereto.

Step S61: The processing unit 105 controls the light projectors 1011 and 1012 to emit light and controls the image sensor 103 to output an image frame IF containing light segment images IL as shown in FIGS. 3, 4 and 5A.

Step S63: After receiving the image frame IF from the image sensor 103, the processing unit 105 identifies whether the light segment image IL in the image frame IF is too wide or is a broken line (i.e. having predetermined feature) so as to identify a confidence level of the image frame IF or the obtained step distance Dr.

S65-S67: These two steps have several implementations. In one aspect, no matter whether the image frame IF includes a predetermined feature, the processing unit 105 firstly calculates and outputs a step distance Dr. The processing unit 105 also outputs a digital signal having at least one bit to indicate whether the obtained step distance Dr is confident or not. It is the external processing unit (e.g., the CPU or MCU of the moving robot 100) outside the sensing chip 1035 to determine whether to use the step distance Dr calculated by the processing unit 105. If the step distance Dr is not used (low confidence level), it means that the moving robot 100 adopts another algorithm or uses a look up table to determine a current step distance. As mentioned above, different look up tables are constructed corresponding to different types of the operating surface.

In another aspect, although the processing unit 105 is arranged to always calculate a step distance Dr, the calculated step distance Dr is outputted only when a high confidence level is identified. When identifying a low confidence level, the processing unit 105 does not output the calculated step distance Dr.

In an alternative aspect, the processing unit 105 calculates a step distance Dr only when a high confidence level is identified. The processing unit 105 does not calculate the step distance Dr when a low confidence level is identified.

As mentioned above, the processing unit 105 identifies a segment height (e.g., Dd in FIG. 3) of a light segment image IL in the image frame IF to accordingly identify a step distance Dr. The relative relationship between the segment height Dd and the step distance Dr is calculated using a previously constructed look up table or a predetermined algorithm, wherein the segment height Dd is referred to a number of pixel rows containing the light segment image IL.

In one non-limiting aspect, the moving robot 100 further includes a memory (outside the sensing chip 1035) for previously storing a look up table containing the relationship between multiple segment heights of the light segment image IL and multiple step distances regarding special operating surfaces. When the sensing chip 1035 outputs a flag signal FS indicating a low confidence level (i.e. indicating a special operating surface), the external processing unit outside the sensing chip 1035 (e.g., 109 shown in FIG. 2) accesses the look up table to identify a current step distance and ignores the step distance Dr outputted by the processing unit 105.

In another non-limiting aspect, the moving robot 100 further includes a second sensor (e.g., 107 in FIG. 2). The second sensor 107 is preferable not an image sensor, e.g. an ultrasonic sensor or a distance sensor. When the sensing chip 1035 outputs a flag signal FS indicating a low confidence level, the second processing unit 109 activates the second sensor 107 to detect a current step distance and ignore the step distance Dr outputted by the processing unit 105.

That is, the concept of the present disclosure is in that although the processing unit 105 may calculate a step distance Dr in all conditions, the calculated step distance Dr has a shift from an actual distance to cause an error when the moving robot 100 is operating on a special surface. Therefore, the processing unit 105 further identifies a segment feature of the light segment image IL to determine whether to calculate a correct current step distance using other ways, e.g., using another sensor or a predetermined look up table.

In the present disclosure, before calculating the image feature of the light segment image IL, the processing unit 105 further digitizes the image frame IF based on a digitizing threshold (e.g., setting the pixel position having a gray value larger than the digitizing threshold as 1 and setting the pixel position having a gray value smaller than the digitizing threshold as 0, or vice versa) to facilitate the calculation of the light segment image IL, image feature and the segment height Dd, e.g., a region that is set as 1 is identified as a light segment image IL.

In addition, in an aspect using two light projectors and before calculating the image feature of the light segment images IL, the processing unit 105 further divides the image frame IF into a left image frame and a right image frame respectively containing one light segment image IL. The processing unit 105 further calculates one image feature and one step distance of the one light segment image IL respectively in the left image frame and the right image frame. That is, the processing unit 105 calculates two image features and two step distances according to one image frame IF. The processing unit 105 identifies the confidence level according to the two image features. The processing unit 105 outputs two step distances or one average of the two distances according to different applications.

Because the gray level of a front end of the light segment image IL in the image frame IF changes due to noises and environment, the calculated step distance has jitters due to the change. To solve this problem, the moving robot 100 of the present disclosure further has a memory for storing a gray level threshold TH2 for identifying a pixel position of the front end of the light segment image IL. The gray level threshold TH2 is a predetermined fixed value, or a varied value determined according to gray value sums of one pixel column or one image frame not containing the light segment image IL. In one aspect, the gray level threshold TH2 is determined according to white noises in the image frame.

Figure 7A:
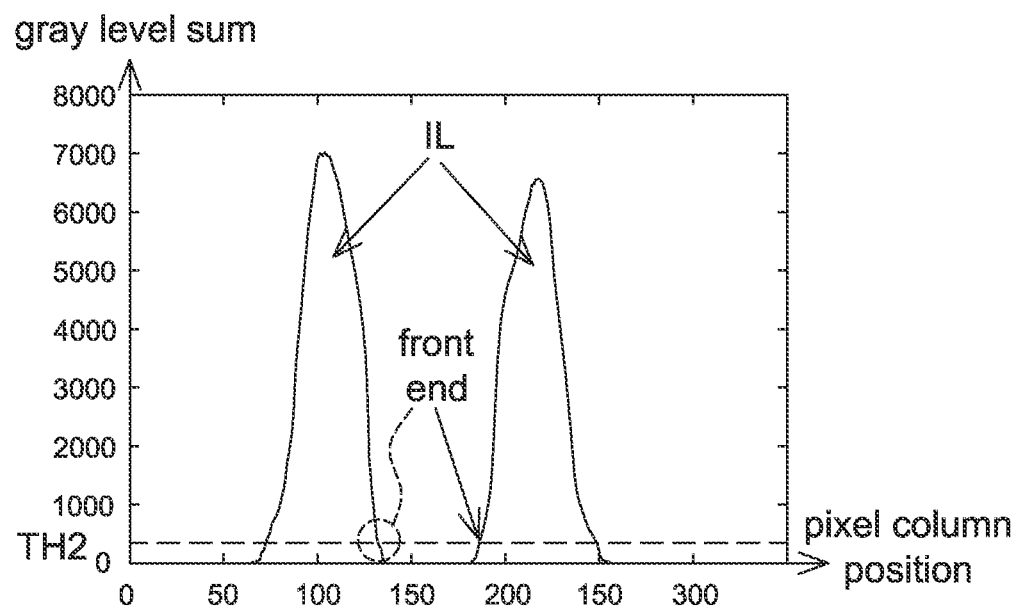
FIG. 7A is a schematic diagram of a gray level threshold and gray level sums of pixel columns of an image frame captured by a moving robot according to one embodiment of the present disclosure.
Figure 7B:
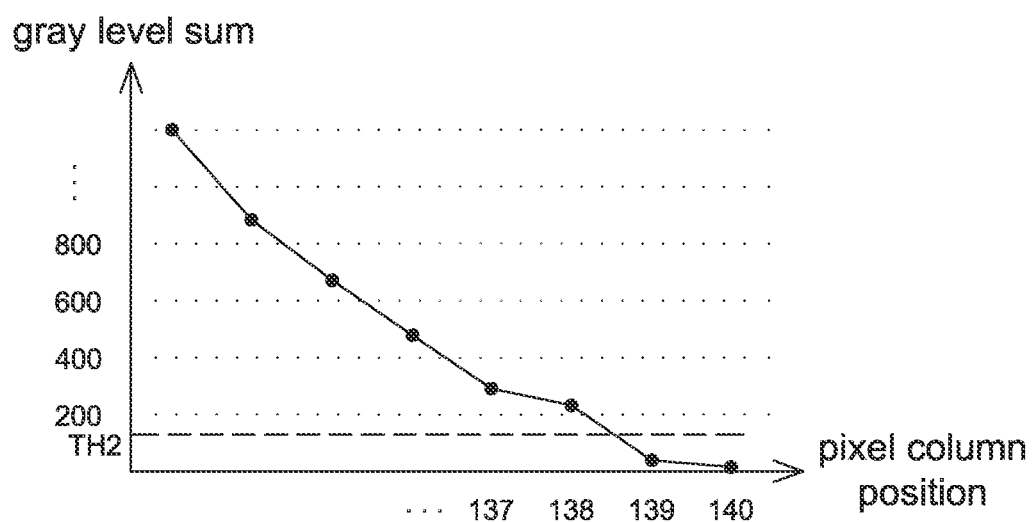
FIG. 7B is a partially enlarged diagram of FIG. 7A.

When the image sensor 103 outputs an image frame IF as shown in FIG. 3, the processing unit 105 calculates gray level sums of every pixel column of multiple pixel columns of the image frame IF to obtain the relationship between gray level sums and pixel column positions (assuming a size of the image frame being 240×320, but not limited to) as shown in FIG. 7A. The processing unit 105 then identifies two pixel columns having the gray level sums closest to the gray level threshold TH2, e.g., FIG. 7B showing the $138^{th}$ and $139^{th}$ pixel columns at two sides of the gray level threshold TH2, wherein FIG. 7B is an enlarged diagram of FIG. 7A. Next, the processing unit 105 performs the pixel interpolation on the two pixel columns, e.g., FIG. 8 showing 10 identical distances being interpolated between the $138^{th}$ and $139^{th}$ pixel columns, and at least two pixel rows closest to the gray level threshold TH2.

Figure 8:
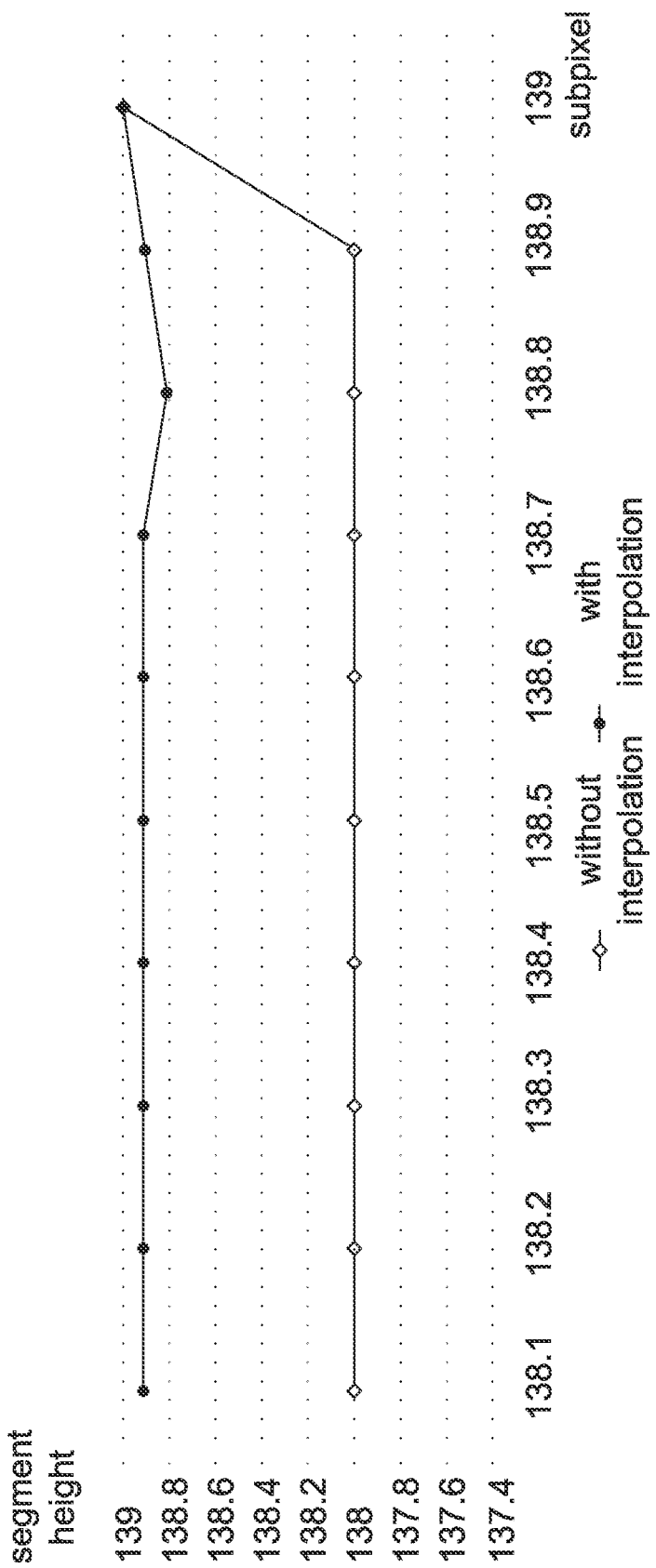
FIG. 8 is a schematic diagram of the jittering of the pixel position of a front end of a light segment image with and without pixel interpolation.

It is seen from FIG. 8 that in the case without the pixel interpolation, the front end of the light segment image IL in the image frame IF associated with the light segment (LS1 or LS2) jumps between the $138^{th}$ and $139^{th}$ pixel rows, each jump covering one pixel range. In the case with the pixel interpolation, the front end of the light segment image IL in the image frame IF associated with the light segment (LS1 or LS2) jumps between the $138.8^{th}$ and $139^{th}$ pixel rows, each jump covering only sub-pixel range. The processing unit 105 calculates the step distance Dr according to a segment height of the $138.8^{th}$ to $139^{th}$ pixel rows to obtain a more accurate result. In other aspects, the processing unit 105 performs the interpolation on all pixel columns to be stored in a larger line buffer.

It should be mentioned that although FIG. 7A shows each light segment image IL having two points intersecting with the gray level threshold TH2, the pixel columns to be interpolated are selected corresponding the front end of the light segment image IL in the image frame IF to accordingly calculate the segment height Dd. The processing unit 105 associates the gray level sums of every pixel column with a corresponding position of the light segment image IL in calculating the gray level sums.

Similarly, when two light projectors are used, the processing unit 105 respectively performs the pixel interpolation on pixels corresponding to two front ends of two light segment images IL to respectively obtain two segment heights Dd having a sub-pixel level to accordingly calculate two corresponding step distances Dr.

The irregular surface herein includes different types of surface such as the plush carpet and the mosaic tile. The moving robot 100 is arranged to operate in a different way, e.g., speeding up, increasing a suction force and/or deactivating a brush rotation (or water valve), if a plush carpet is detected in front. Therefore in an alternative embodiment of the present disclosure, the processing unit (e.g., 105 or 109) further identifies an obstacle height according to the vertical light segment image so as to distinguish a plush carpet from other irregular surfaces (e.g., mosaic tile) since the plush carpet is generally higher than the mosaic tile.

In this alternative embodiment, the light projector 1011 projects a vertical light segment LS1 toward a moving direction as shown in FIG. 1. The image sensor 103 captures an image frame (e.g., IF shown in FIG. 9) containing a light segment image IL1 associated with the vertical light segment LS1.

The processing unit (e.g., 105 or 109) recognizes (e.g., outputting a flag signal FS) a plush carpet in the moving direction when a width W1 of the light segment image IL1 is wider than a width threshold, and an obstacle height calculated according to the light segment image IL1 is larger than a height threshold. As mentioned above, the light segment image IL1 becomes wider when the vertical light segment LS1 is projected on the plush carpet.

The width threshold and the height threshold are previously stored and recorded in the moving robot 100, e.g., in a memory thereof.

Figure 9:
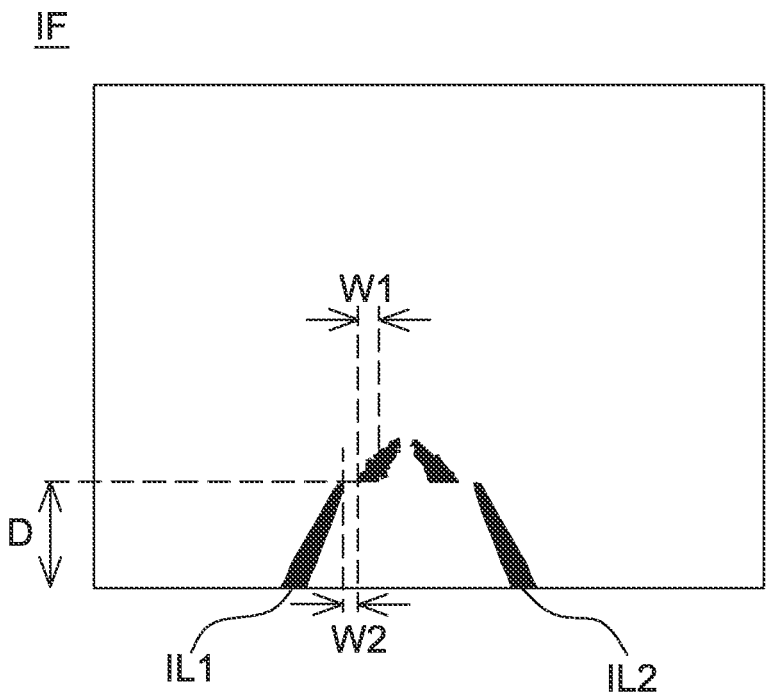
FIG. 9 is a schematic diagram of an image frame containing vertical light segments projecting on a plush carpet and captured by a moving robot according to one embodiment of the present disclosure.

In one aspect, the processing unit (e.g., 105 or 109) calculates the obstacle height by searching a broken point which separates the light segment image IL1 into two parts, e.g., FIG. 9 showing a shorter upper part indicating a part of the vertical light segment IL1 being projected on the plush carpet, and a longer lower part indicating another part of the vertical light segment IL1 being projected on a regular surface. The processing unit (e.g., 105 or 109) then calculates a transverse distance W2 between the two parts of the light segment image ILL and obtains the obstacle height (i.e. a height of an obstacle actually in front of the moving direction) corresponding to the transverse distance W2.

In this alternative embodiment, the moving robot 100 stores and records the relationship between transverse distances W2 the actual obstacle heights such that when the processing unit obtains a transverse distance W2, a corresponding obstacle height is obtainable based on the relationship. Preferably, the relationship is previously constructed (e.g., based on the arrangement of the light projector and light projecting angle 1011 as well as a field of view of the image sensor 103) and stored in the moving robot 100 before shipment.

Preferably, the obstacle height is between a predetermined range for specifying the plush carpet. That is, the obstacle height which is too large or too small is not recognized as the plush carpet. For example, the processing unit identifies whether the obtained obstacle height is smaller than an upper threshold and larger than a lower threshold as a condition to confirm the plush carpet.

To improve the user experience, the processing unit (e.g., 105 or 109) further calculates a distance from the obstacle (e.g., the plush carpet) to perform the corresponding control. In one aspect, the processing unit searches a broken point which separates the light segment image IL1 into two parts as shown in FIG. 9. Then, the processing unit calculates a segment height D of one of the two parts of the light segment image IL1 closer to an edge of the image frame IF (i.e. lower part), and obtains a distance from the plush carpet corresponding to the segment height D. Similarly, the relationship between segment heights D and distances from the plush carpet is previously stored and recorded in the moving robot 100 before shipment such that when the processing unit obtains a segment height D, a corresponding distance from the plush carpet is obtainable based on the relationship, similar to calculating a step distance mentioned above. The relationship is constructed based on the arrangement of the light projector and light projecting angle 1011 as well as a field of view of the image sensor 103.

In the case that the light segment image IL1 does not have the broken point, the processing unit confirms there is no plush carpet in front.

In one aspect, the processing unit (e.g., 105 or 109) further increases a moving speed of the moving robot 100 when the distance from the plush carpet is smaller than or equal to a first predetermined distance so as to be able to climb up the plush carpet.

In another aspect, the processing unit (e.g., 105 or 109) increases a suction force (and turns off a sprinkler if included) when the distance is smaller than or equal to a second predetermined distance such that the moving robot 100 is suitable to operate on the plush carpet.

In an alternative aspect, the processing unit (e.g., 105 or 109) deactivates a brush rotation (functioned to collect dusts and fragments) when the distance is smaller than or equal to a third predetermined distance.

In the present disclosure, the first predetermined distance, the second predetermined distance and the third predetermined distance are identical to or different from each other.

As shown in FIG. 1, the moving robot 100 may include a second light projector 1012 for projecting another vertical light segment LS2 toward the moving direction. The image sensor 103 captures the image frame IF containing another light segment image (e.g., IL2 as shown in FIG. 9) associated with said another vertical light segment LS2. The processing unit recognizes the plush carpet further according to a width of said another light segment image IL2 and an obstacle height calculated according to said another light segment image IL2.

The method of calculating the width of said another light segment image IL2 and the obstacle height according to said another light segment image IL2 is identical to that of calculating the width of the light segment image IL1 and the obstacle height according to the light segment image ILL and thus details thereof are not repeated herein.

As mentioned above, the second light projector 1012 is arranged for increasing the detection range of the moving robot 100.

Figure 10:
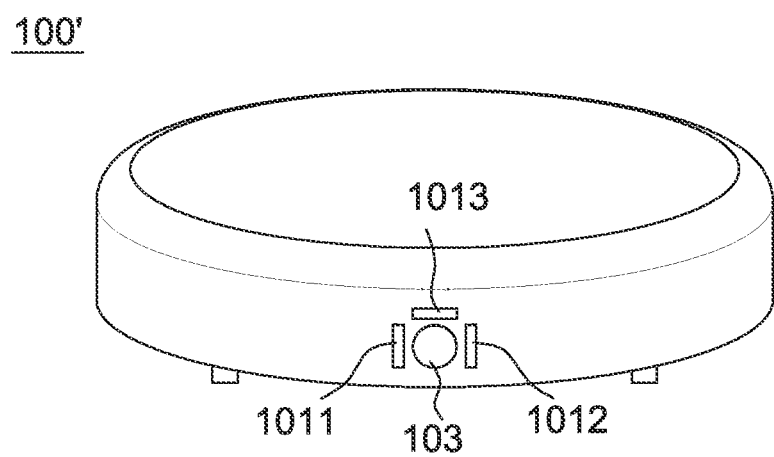
FIG. 10 is a solid diagram of a moving robot according to another embodiment of the present disclosure.

Please refer to FIG. 10, it is a solid diagram of a moving robot 100' according to another embodiment of the present disclosure. The difference between the moving robot 100' and 100 is that the moving robot 100' further includes a light projector for projecting a horizontal light segment. The components in FIG. 10 identical to those of the moving robot 100 in FIG. 1 are indicated by identical numeral references.

That is, the moving robot 100' includes a first light projector 1011, a third light projector 1013, an image sensor 103 and a processing unit (e.g., 105 or 109).

The first light projector 1011 projects a vertical light segment LS1 toward a moving direction. The third light projector 1013 projects a horizontal light segment toward the moving direction. The third light projector 1013 also includes a light source and a diffractive optical element (DOE) similar to the first light projector 1011.

The image sensor 103 captures an image frame containing a first light segment image (e.g., IL1 in FIG. 9) associated with the vertical light segment LS1 and a second light segment image (e.g., IL3 in FIG. 11 or 12) associated with the horizontal light segment. In one aspect, the image sensor 103 captures image frames IF in FIG. 9 and FIG. 11 or 12 at different times. In the case that the first light projector 1011 and the third light projector 1013 emit light at the same time, one image frame contains both the light segment images IL1 and IL3.

The processing unit (e.g., 105 or 109) recognizes a plush carpet in the moving direction when a vibration intensity of the second light segment image IL3 is higher than a predetermined threshold, and an obstacle height calculated according to the first light segment image IL1 is larger than a height threshold. The method of calculating the obstacle height has been illustrated above, and thus details thereof are not repeated herein.

This embodiment recognizes a plush carpet further according to a vibration intensity of the second light segment image IL3 based on that when the horizontal light segment is projected on an irregular surface (e.g., the plush carpet), the captured second light segment image IL3 fluctuates severely.

Figure 11:
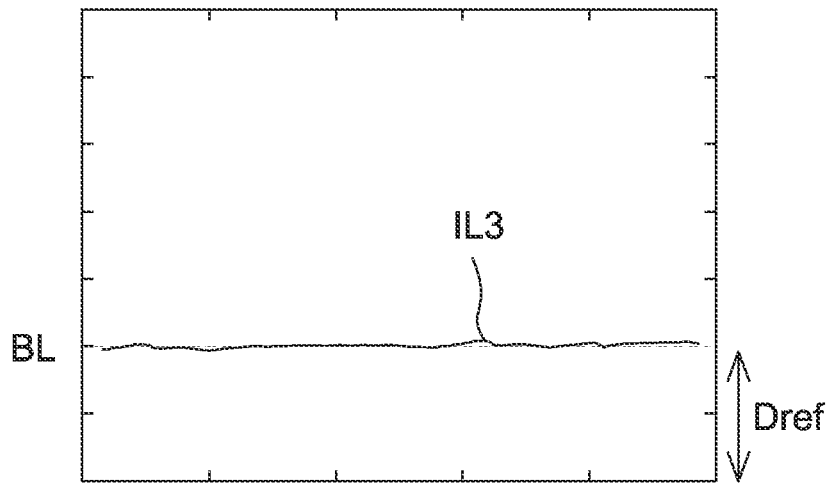
FIG. 11 is a schematic diagram of an image frame containing a horizontal light segment projecting on a non-plush carpet and captured by a moving robot according to one embodiment of the present disclosure.
Figure 12:
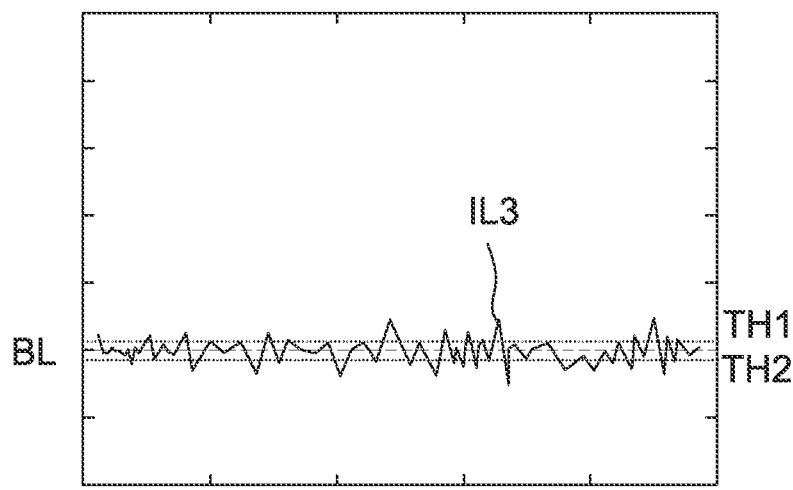
FIG. 12 is a schematic diagram of an image frame containing a horizontal light segment projecting on a plush carpet and captured by a moving robot according to one embodiment of the present disclosure.

For example, FIG. 11 shows a smoother second light segment image IL3 indicating that the horizontal light segment is not projected on the plush carpet; whereas FIG. 12 shows a zigzag second light segment image IL3 indicating that the horizontal light segment is projected on the plush carpet.

In one aspect, the processing unit (e.g., 105 or 109) compares an amplitude of the second light segment image IL3 with a baseline BL in the image frame IF, and counts a number of times that the amplitude of the second light segment image IL3 changing from above the baseline BL to below the baseline BL as well as from below the baseline BL to above the baseline BL as the vibration intensity.

For example, a counted number is increased by 1 when the amplitude of the second light segment image IL3 changes from above the baseline BL to below the baseline BL or changes from below the baseline BL to above the baseline BL. For example, a counted number is increased by 1 when the amplitude of the second light segment image IL3 changes from above the baseline BL to below the baseline BL and then changes from below the baseline BL to above the baseline BL, or vice versa. The baseline BL is determined previously based on the arrangement of the third light projector 1013 and light projecting angle as well as a field of view of the image sensor 103.

When the counted number of times is larger than a predetermined value, it means that the horizontal light segment is projected on an irregular surface (e.g., the plush carpet). Otherwise, the moving robot 100' does not recognize a plush carpet in front.

In another aspect, the processing unit (e.g., 105 or 109) calculates a standard deviation of the second light segment image IL3 as the vibration intensity. When the calculated standard deviation is larger than a predetermined value, it means that the horizontal light segment is projected on an irregular surface (e.g., the plush carpet). Otherwise, the moving robot 100' does not recognize a plush carpet in front.

In an alternative aspect, the processing unit (e.g., 105 or 109) compares an amplitude of the second light segment image IL3 with a first threshold (e.g., TH1 as shown in FIG. 12) above a baseline BL in the image frame IF as well as a second threshold (e.g., TH2 as shown in FIG. 12) below the baseline BL in the image frame IF, and counts a number of times that the amplitude of the second light segment image IL3 changing from above the first threshold TH1 to below the second threshold TH2 as well as from below the second threshold TH2 to above the first threshold TH1 as the vibration intensity. The first threshold TH1 and the second threshold TH2 is to filter noises, and are determined previously.

For example, a counted number is increased by 1 when the amplitude of the second light segment image IL3 changes from above the first threshold TH1 to below the second threshold TH2 or changes from below the second threshold TH2 to above the first threshold TH1. For example, a counted number is increased by 1 when the amplitude of the second light segment image IL3 changes from above the first threshold TH1 to below the second threshold TH2 and then changes from below the second threshold TH2 to above the first threshold TH1, or vice versa.

When the counted number of times is larger than a predetermined value, it means that the horizontal light segment is projected on an irregular surface (e.g., the plush carpet). Otherwise, the moving robot 100' does not recognize a plush carpet in front.

In an alternative aspect, the moving robot 100' recognizes the plush carpet further when a width W1 of the first light segment image IL1 is wider than a width threshold as mentioned above. That is, the processing unit uses a combination of three conditions, including light segment image width W1, vibration intensity and obstacle height (e.g., corresponding to D shown in FIG. 9) to recognize a plush carpet.

In an alternative aspect, the processing unit (e.g., 105 or 109) further calculates a distance from the plush carpet to perform corresponding controls as mentioned above, e.g., including speeding up, increasing a suction force and/or deactivating a brush rotation (a water valve if included). The method of obtaining the distance from the plush carpet according to the light segment image IL1 or IL2 has been illustrated above and thus details thereof are not repeated herein.

In an alternative aspect, the moving robot 100' includes a second light projector 1012 for projecting another vertical light segment (e.g., LS2 shown in FIG. 1) toward the moving direction. As mentioned above, the image sensor 103 captures the image frame containing another light segment image (e.g., IL2 shown in FIG. 9) associated with said another vertical light segment LS2. The processing unit (e.g., 105 or 109) recognizes the plush carpet further according to an obstacle height calculated according to said another light segment image IL2, similar to calculating the obstacle height calculated according to the first light segment image ILE Similarly, the processing unit (e.g., 105 or 109) recognizes the plush carpet further according to a width of said another light segment image IL2, similar to calculating the width of the first light segment image ILE As mentioned above, the conventional cleaning robot has the problem of unable to accurately identify a step distance on a special operating surface. Accordingly, the present disclosure further provides a moving robot (e.g., FIGS. 1-2) that further outputs a flag signal for indicating whether a current operating surface is a special operating surface to accordingly determine an algorithm or sensor for calculating the step distance. In addition, by performing the pixel interpolation at a front end of a light segment image, the amplitude jitter of the obtained step distance is reduced without using a frame buffer to improve the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A moving robot, comprising:
    a light projector, configured to project a vertical light segment toward a moving direction;
    an image sensor, configured to capture an image frame containing a light segment image associated with the vertical light segment; and
    a processing unit, configured to
        search a broken point which separates the light segment image into two parts in the image frame,
        calculate a transverse distance between the two parts of the light segment image,
        obtain an obstacle height corresponding to the transverse distance, and
        output a flag signal indicating a plush carpet being confirmed in the moving direction when the obstacle height is smaller than an upper threshold and larger than a lower threshold.

2. The moving robot as claimed in claim 1, wherein the processing unit is further configured to compare a width of the light segment image with a width threshold in confirming the plush carpet.

3. The moving robot as claimed in claim 1, wherein the processing unit is further configured to
    calculate a segment height of one of the two parts of the light segment image closer to an edge of the image frame, and
    obtain a distance from the plush carpet corresponding to the segment height.

4. The moving robot as claimed in claim 3, wherein the processing unit is further configured to increase a moving speed of the moving robot when the distance is smaller than or equal to a first predetermined distance.

5. The moving robot as claimed in claim 3, wherein the processing unit is further configured to increase a suction force when the distance is smaller than or equal to a second predetermined distance.

6. The moving robot as claimed in claim 3, wherein the processing unit is further configured to deactivate a brush rotation when the distance is smaller than or equal to a third predetermined distance.

7. The moving robot as claimed in claim 1, further comprising another light projector configured to project another vertical light segment toward the moving direction, wherein
    the image sensor is configured to capture the image frame containing another light segment image associated with the another vertical light segment, and
    the processing unit is configured to confirm the plush carpet in the moving direction further according to another obstacle height calculated according to the another light segment image.

8. A moving robot, comprising:
  a first light projector, configured to project a vertical light segment toward a moving direction;
  a third light projector, configured to project a horizontal light segment toward the moving direction;
  an image sensor, configured to capture an image frame containing a first light segment image associated with the vertical light segment and a second light segment image associated with the horizontal light segment; and
  a processing unit, configured to recognize that there is no plush carpet in the moving direction when a vibration intensity of the second light segment image is not higher than a predetermined threshold.

9. The moving robot as claimed in claim 8, wherein the processing unit is further configured to
  calculate an obstacle height by
    searching a broken point which separates the first light segment image into two parts in the image frame,
    calculating a transverse distance between the two parts of the first light segment image, and
    obtaining the obstacle height corresponding to the transverse distance, and
  recognize the plush carpet according to the obstacle height.

10. The moving robot as claimed in claim 8, wherein the processing unit is configured to calculate the vibration intensity by
  comparing an amplitude of the second light segment image with a baseline in the image frame, and
  counting a number of times that the amplitude of the second light segment image changing from above the baseline to below the baseline as well as from below the baseline to above the baseline as the vibration intensity.

11. The moving robot as claimed in claim 8, wherein the processing unit is configured to calculate a standard deviation of the second light segment image as the vibration intensity.

12. The moving robot as claimed in claim 8, wherein the processing unit is configured to calculate the vibration intensity by
  comparing an amplitude of the second light segment image with a first threshold above a baseline in the image frame as well as a second threshold below the baseline in the image frame, and
  counting a number of times that the amplitude of the second light segment image changing from above the first threshold to below the second threshold as well as from below the second threshold to above the first threshold as the vibration intensity.

13. The moving robot as claimed in claim 8, wherein the processing unit is configured to recognize the plush carpet further by comparing a width of the first light segment image with a width threshold.

14. The moving robot as claimed in claim 8, wherein the processing unit is further configured to
  search a broken point which separates the first light segment image into two parts in the image frame,
  calculate a segment height of one of the two parts of the first light segment image closer to an edge of the image frame, and
  obtain a distance from the plush carpet corresponding to the segment height.

15. The moving robot as claimed in claim 14, wherein the processing unit is further configured to increase a moving speed of the moving robot when the distance is smaller than or equal to a first predetermined distance.

16. The moving robot as claimed in claim 14, wherein the processing unit is further configured to increase a suction force when the distance is smaller than or equal to a second predetermined distance.

17. The moving robot as claimed in claim 14, wherein the processing unit is further configured to deactivate a brush rotation when the distance is smaller than or equal to a third predetermined distance.

18. The moving robot as claimed in claim 9, further comprising a second light projector configured to project another vertical light segment toward the moving direction, wherein
  the image sensor is configured to capture the image frame containing another light segment image associated with the another vertical light segment, and
  the processing unit is configured to recognize the plush carpet further according to another obstacle height calculated according to the another light segment image.

19. The moving robot as claimed in claim 18, wherein the processing unit is configured to recognize the plush carpet further according to a width of the another light segment image.

20. The moving robot as claimed in claim 8, wherein the processing unit is further configured to
  search a broken point which separates the first light segment image into two parts in the image frame, and
  recognize that there is no plush carpet in the moving direction upon no broken point in the first light segment image being found.

* * * * *